(12) United States Patent
Kim et al.

(10) Patent No.: US 9,105,890 B2
(45) Date of Patent: Aug. 11, 2015

(54) CYLINDRICAL TYPE SECONDARY BATTERY WITH UPPER AND LOWER BATTERY ASSEMBLIES AND FABRICATION METHOD THEREOF

(75) Inventors: Dae Kyu Kim, Yongin-si (KR); Yong Hyun Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 145 days.

(21) Appl. No.: 13/449,121

(22) Filed: Apr. 17, 2012

(65) Prior Publication Data

US 2012/0202108 A1 Aug. 9, 2012

Related U.S. Application Data

(63) Continuation of application No. 11/372,484, filed on Mar. 8, 2006, now Pat. No. 8,187,743.

(30) Foreign Application Priority Data

Mar. 9, 2005 (KR) .................. 10-2005-0019829

(51) Int. Cl.
*H01M 2/00* (2006.01)
*H01M 2/08* (2006.01)
(Continued)

(52) U.S. Cl.
CPC .......... *H01M 2/0413* (2013.01); *H01M 2/0426* (2013.01); *H01M 2/0434* (2013.01); *H01M 2/22* (2013.01); *H01M 2200/106* (2013.01); *Y10T 29/49108* (2015.01)

(58) Field of Classification Search
CPC ............ H01M 2/0413; H01M 2/0486; H01M 2/1229; H01M 2/347; H01M 2/348; H01M 2/34; H01M 2/0426; H01M 2/22; H01M 2/0434; H01M 2200/106; H01M 10/0525; Y02E 60/12

USPC ......... 429/121, 131, 161, 164, 166, 170, 174, 429/175, 178–181, 185, 246; 29/623.1–623.2, 623.4
See application file for complete search history.

(56) References Cited

U.S. PATENT DOCUMENTS 1,767,085 A * 6/1930 Marko ...................... 429/175
3,320,096 A 5/1967 Jammet
(Continued)

FOREIGN PATENT DOCUMENTS

| JP | 2000-021436 A | 1/2000 |
| KR | 2000-0042978 | 7/2000 |

(Continued)

OTHER PUBLICATIONS

Machine Translation and Abstract in English of KR 2000-0042978.*
(Continued)

*Primary Examiner* — Maria J Laios
*Assistant Examiner* — Claire L Roe
(74) *Attorney, Agent, or Firm* — Christie, Parker & Hale, LLP (57) ABSTRACT

A secondary battery having an upper battery assembly including an upper can housing a cap unit having an electrode terminal adapted to electrically connect to an external device and a gasket inserted between the cap unit and one end portion of the upper can for sealing and insulating the cap unit and the upper can. The secondary battery also has a lower battery assembly including a lower can housing an electrode assembly, the electrode assembly having a first electrode, a second electrode, and a separator interposed between the first electrode for preventing a short circuit between the two electrodes. A first electrode tap connects the first electrode to the cap unit and a second electrode tap connects the second electrode to the lower can.

4 Claims, 6 Drawing Sheets

(51) Int. Cl.
*H01M 2/04* (2006.01)
*H01M 2/22* (2006.01)

(56) References Cited

U.S. PATENT DOCUMENTS

| | | | |
|---|---|---|---|
| 3,514,338 | A | 5/1970 | Shakour |
| 3,736,190 | A | 5/1973 | Dey et al. |
| 4,307,158 | A | 12/1981 | Thibault |
| 4,347,450 | A | 8/1982 | Colligan |
| 4,489,268 | A | 12/1984 | Beachy |
| 6,458,488 | B1 | 10/2002 | Honbo et al. |
| 2001/0003863 | A1* | 6/2001 | Thibault et al. .............. 29/623.1 |
| 2001/0016289 | A1 | 8/2001 | Oura et al. |
| 2002/0122974 | A1 | 9/2002 | Kim |
| 2003/0031918 | A1 | 2/2003 | Li |
| 2003/0096158 | A1 | 5/2003 | Takano et al. |
| 2004/0121229 | A1 | 6/2004 | Kim et al. |
| 2004/0126651 | A1 | 7/2004 | Kim et al. |
| 2005/0058898 | A1 | 3/2005 | Dokko |

FOREIGN PATENT DOCUMENTS

| | | |
|---|---|---|
| KR | 2000-0042978 A | 7/2000 |
| KR | 10-2004-0107926 | 12/2004 |
| KR | 10-2005-0019359 | 3/2005 |

OTHER PUBLICATIONS

Korean Patent Abstracts, Publication No. 10-2000-0042978 a, dated Jul. 15, 2000, in the name of Jeong Gi Kim.
K-PION Machine translation of KR 2000-0042978, published on Jul. 15, 2000, retrieved on Jun. 24, 2009 (8 pages).
Machine English Translation of JP 2000-021436 A (12 pages).

\* cited by examiner (PRIOR ART)

CYLINDRICAL TYPE SECONDARY BATTERY WITH UPPER AND LOWER BATTERY ASSEMBLIES AND FABRICATION METHOD THEREOF

This application is a continuation of U.S. patent application Ser. No. 11/372,484, filed Mar. 8, 2006, which claims the priority to and benefit of Korean Patent Application No. 10-2005-0019829, filed on Mar. 9, 2005, in the Korean Intellectual Property Office, the entire of both of which is incorporated herein by reference.

BACKGROUND OF THE INVENTION

1. Field of the Invention

The present invention relates to an engagement structure of a cap unit and a can in a cylindrical type secondary battery and a method of fabricating the same.

2. Description of Related Art

Since secondary batteries have many advantages such as rechargeability, miniaturization, and high capacity, they are frequently used and have become popular. Secondary batteries can be classified into Ni-MH batteries and Li-ion batteries depending on the electrode active material.

It is known that liquid electrolyte, solid polymer electrolyte, or gel type electrolyte are used as the electrolyte of Li-ion secondary batteries. Also, the lithium secondary battery can be classified into a can type or a pouch type depending on the container into which an electrode assembly is inserted.

In a can type lithium secondary battery, the electrode assembly is inserted into a can which is formed by a deep drawing method using metallic materials such as aluminum or an aluminum alloy. Typically, liquid electrolyte is used in a can type secondary battery structure.

Can type secondary batteries can be classified into hexahedronal can types and cylindrical can types. Since the hexahedronal can type can be formed in a thin hexahedronal shape, it can allow installation flexibility when it is used in electronic devices such as a mobile phone. The cylindrical can type is usually used in high capacity electronic devices, in which a plurality of secondary batteries are combined into a single battery pack.

Figure 1:
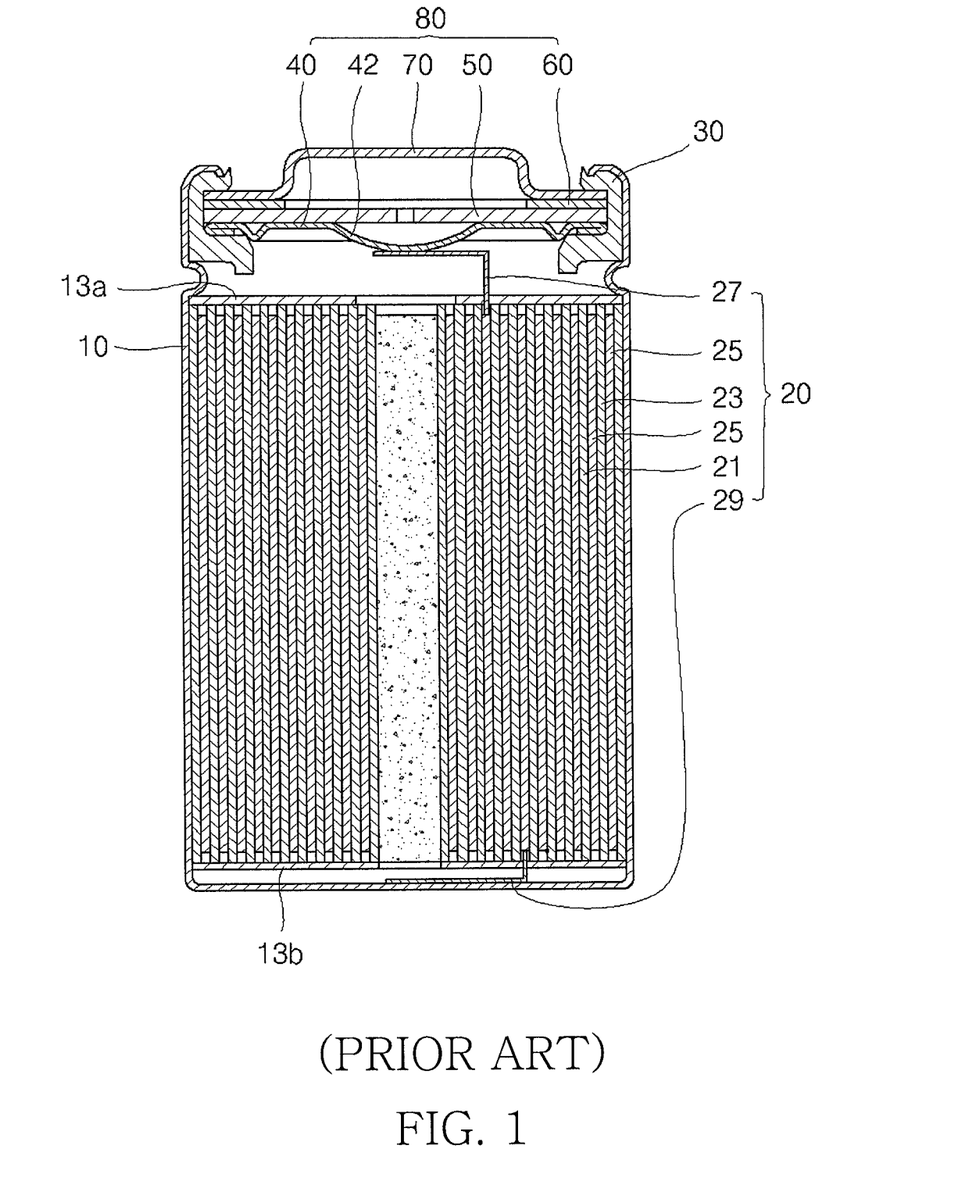
FIG. 1 is a cross-sectional elevation view of a conventional cylindrical can type secondary battery.

FIG. 1 is a cross-sectional view illustrating an exemplary structure of a conventional cylindrical can type secondary battery.

A method of fabricating a conventional cylindrical can type secondary battery will be described with reference to FIG. 1. First, two electrode plates 25 having a generally rectangular shape and separators 21, 23 interposed between the electrode plates 25 for preventing short circuits between the plates are stacked and wound in a jelly roll configuration to provide an electrode assembly 20. Each electrode plate is formed by coating an active material slurry on a charge collector composed of metallic foil.

The charge collector has uncovered areas absent the active material slurry on either end of the charge collector in a direction in which the electrode plates 21, 23 are wound. On the uncovered areas, electrode taps 27, 29 are provided for each electrode plate. The electrode tap 27 is electrically connected to a cap unit 80. The electrode tap 29 is electrically connected to a cylindrical can 10. The cap unit 80 is insulated from the cylindrical can 10 to provide a path for connecting the electrode assembly to external circuits during charging/discharging of the battery. From the electrode assembly 20, the electrode tap 27 is extracted toward an opening of the cylindrical can 10 and the other electrode tap 29 is extracted in an opposite direction.

The electrode assembly 20 with upper and lower insulation plates 13a, 13b is inserted into the cylindrical can 10 through the can opening. Beads for preventing floating of the electrode assembly in the can are formed, and electrolyte is injected. An insulation gasket 30 is provided around the inside wall of the can opening and a cap unit 80 for covering the can opening is installed inside the gasket 30.

In the cap unit 80, a bent assembly welded to one of the electrode taps 27, a positive thermal coefficient (PTC) element 60, and a cap-up having an electrode terminal are included. The bent assembly typically includes a bent 40 and a current interrupt device (CID) 50 which is used in combination with the bent 40 to cut off a current path.

Subsequently, the side wall of the can opening is pressed toward the center and bottom of the can by using the cap-up 70 inserted into the inside of the gasket 30 as a stopper. In addition, tubing work is performed to form an exterior of the battery.

The electrode tap 27 is formed to have enough length to allow the electrode tap 27 to be welded to the bent 40. Also, the electrode tap 27 is bent while the bent assembly is inserted into the cap opening into which the gasket 30 is already installed. In this process, a small space between the bent assembly and the electrode assembly 20 is provided for process convenience.

After the electrode assembly 20 and the upper insulation plate 13a are inserted into the can, bead areas are provided for fixing these components to the can. However, the bead areas also contribute to formation of a space between the electrode assembly 20 and the cap unit 80. Such spaces are not desired in view of miniaturization and high capacity of the battery.

When the cap unit is installed in the can opening into which the gasket is already inserted and clamping for enveloping the battery is performed, if a high pressure is applied to the side wall of the can opening to improve sealing reliability, the bead areas may be significantly crushed, distorted, or deformed.

The deformation of the bead areas may be greatly varied. When the deformation is significant, the bead areas may be weakened and finally fractured by even a small external force causing air or humidity to flow into the battery or electrolyte to leak.

Also, the deformation of the bead areas may cause irregular heights of each battery module so that the battery module may not sufficiently contact probes of a manufacturing device in subsequent forming processes in which the initial charging and discharging for secondary batteries are executed.

SUMMARY OF THE INVENTION

The present invention provides a can type secondary battery and a method of fabricating the same by which problems such as deformation of beads and an unnecessary gap between an electrode assembly and a cap unit are prevented.

A can type secondary battery and a method of fabricating the same is provided having increased resistance to deformation during a fabricating process, a minimized battery size, and an increased battery capacity.

A can type secondary battery and a method of fabricating the same is provided, by which clamping can be performed at a sufficient pressure to guarantee reliability of a battery sealing condition, and by which the length of the battery can be efficiently utilized.

According to an exemplary embodiment of the present invention, a secondary battery is provided having an upper battery assembly including an upper can housing a cap unit having an electrode terminal adapted to electrically connect to an external device and a gasket inserted between the cap unit and one end portion of the upper can for sealing and insulating the cap unit and the upper can. The secondary battery also has a lower battery assembly including a lower can housing an electrode assembly, the electrode assembly having a first electrode, a second electrode, and a separator interposed between the first electrode for preventing a short circuit between the two electrodes. A first electrode tap connects the first electrode to the cap unit and a second electrode tap connects the second electrode to the lower can.

The upper battery assembly may be formed by inserting the cap unit into the inside wall of the upper can in which the gasket has been installed and robustly combining them by clamping.

The upper and lower battery assemblies may be combined with each other by a screw engagement using threads formed on both of a lower portion of the upper can and an upper portion of the lower can or by a sleeve engagement using sleeves for inserting one of an upper portion of the lower can and a lower portion of the upper can into the other. Also, they may be combined by welding.

When the upper and lower battery assemblies are combined by a screw engagement, an electrode tap of the electrode assembly may be electrically connected to a bent portion of the cap unit. In this case, when the upper can is rotated for a screw engagement, means can be provided for preventing rotation of the electrode tap caused by friction with the bent portion. For example, a trench may be provided for storing the electrode tap on a top surface of the upper insulation plate installed on the electrode assembly.

The can type secondary battery according to the present invention may be used in electric power tools such as power drills or power saws which consume abundant currents in a short time and have a high power and a high resistance to external vibration or impact.

According to another aspect of the present invention, there is provided a method of fabricating a can type secondary battery, the method including the processes of: forming an upper battery assembly by inserting a gasket in an inside wall of an upper can; installing a cap unit on the gasket in the upper can; and combining the upper can with the cap unit by a clamping work for downwardly and inwardly pressing the inside wall of the upper can; forming a lower battery assembly by inserting an electrode assembly into a lower can; and combining the upper and lower battery assemblies with each other.

The process of forming a lower battery assembly may include: inserting the electrode assembly into the lower can together with upper and lower insulation plates; and bending an electrode tap extracted from the electrode assembly under the lower insulation plate and welding the electrode tap to a bottom surface of the lower can.

The process of combining the upper and lower battery assemblies may include: forming threads on corresponding portions of the upper and lower cans; and engaging the upper and lower battery assemblies by screwing the upper and lower cans with respect to each other.

Otherwise, the process of combining the upper and lower battery assemblies may include: forming sleeves in one of the upper and lower cans; and engaging the upper and lower cans by forcibly inserting one of the upper and lower cans into the other. In this case, an adhesive or gasket having conductivity may be applied to engagement contact portions between the upper and lower battery assemblies.

In the process of combining the upper and lower battery assemblies, a welding work may be performed to the upper and lower battery assemblies without or after engaging them by using a screw or sleeve engagement.

DETAILED DESCRIPTION OF THE INVENTION

A method of fabricating a cylindrical can type secondary battery according to an embodiment of the present invention will be described with reference to FIG. 2.

First, a method of fabricating a lower battery assembly will be described. Similarly to a conventional method, two electrode plates 25 having a generally rectangular sheet shape are stacked and wound into a jelly roll configuration to provide an electrode assembly. Separators 21, 23 are disposed between the two electrode plates 25 and on any surface where the wound electrode plates make contact with the other when they are wound in order to prevent a short circuit.

The electrode plate may be formed by coating an active material slurry on a charge collector which may be a metallic foil or mesh made of aluminum or copper. The slurry is typically made by agitating a granular active material, a subsidiary conductor, a binder, and a plasticizer with a solvent being added. The solvent is removed in an electrode forming process.

There are areas of the charge collector absent slurry at either end of the charge collector. On the uncovered areas, one electrode tap is provided for each electrode plate. One of the electrode taps is upwardly extracted through an opening of a cylindrical can, whereas the other electrode tap is downwardly extracted in an opposite direction.

In a cylindrical can 10a, a lower insulation plate 13b, an electrode assembly 20, and an upper insulation plate 13a are sequentially installed. The electrode tap 29 downwardly extracted is bent such that the bent portion is parallel to a lower surface of the electrode assembly 20, and welded to the bottom surface of the cylindrical can. In this case, the lower insulation plate 13b is disposed between the bent portion of the electrode tap 29 and the bottom surface of the electrode assembly 20 so that the electrode tap 29 is not short-circuited.

In order to weld the electrode tap to the bottom surface of the cylindrical can, a welding rod is inserted through a center hole of the electrode assembly and through a center hole of the lower insulation plate. Then, the electrode tap 29 and the bottom surface of the cylindrical can are welded to each other.

The electrode tap 27 is upwardly extracted through a thru-hole of the upper insulation plate 13*a* and bent to make contact with a top surface of the upper insulation plate. The upper insulation plate may have a trench for storing the electrode tap on its top surface. The trench may be formed with a depth sufficient to allow the electrode tap 27 to make contact with an electrical connection portion 42 of bent 40 which in turn is connected to the CID 50, without a separate connection structure being provided and to retain the connection state between the electrode tap 27 and the electrical connector 42.

If the upper insulation plate 13*a* does not contain a trench, the bent electrode tap 27 may be fixed on the upper insulation plate 13*a* by using an adhesive or a gluing agent. In addition, the bent portion of the electrode tap 27 does not necessarily have a flat surface but may have a structure such as a plate spring.

Electrolyte may then be inserted into the electrode assembly of the lower cylindrical can.

The lower can 10*a* has threads 100 on its outer rim. The upper end of the electrode assembly 20, the upper insulation plate 13*a*, and the level of the electrolyte may be approximately level with the top end of the cylindrical can.

Now, a method of fabricating an upper battery assembly will be described. First, an upper cylindrical can 10*b* is prepared. The upper cylindrical can also have mating threads 101 around its inner rim, which will be combined with the threads 100 around the outer rim of the lower cylindrical can 10*a*.

Around the inside wall of the upper cylindrical can, an insulation gasket 30 is installed. Around the lower end of the insulation gasket 30, an inner rim portion is inwardly protruded so that the cap unit can be appropriately positioned in the upper can.

The cap unit 80 for covering the can opening is installed on the inside of the gasket 30. The cap unit 80 includes: a bent 40 having a connection portion which protrudes in its center and a CID 50 is used in combination with the bent 40 to cut off a current path. The cap unit 80 also includes a PTC element 60 connected to CID 50 for cutting off a current path in the battery when the battery is overheated and a cap-up 70 having an electrode terminal outwardly protruded to provide an electrical connection to external devices. A protection circuit board (not shown) may be further provided on the PTC element 60.

The components of the cap unit 80 may be sequentially installed on the inside of the gasket 30. However, a cap unit 80 in which the above components have already been assembled may be inserted into the inside of the gasket 30. Clamping is performed to provide an upper battery assembly. Specifically, the side wall of the upper can 10*b* is pressed toward the center of the can while the lower end of the upper can 10*b* or an outer portion of the bent is supported by a support so as to maintain their original shape. As a result, it is possible to apply a pressure to sufficiently seal a battery during clamping.

Then, the upper and lower battery assemblies are combined with each other. The outer diameter of the upper end of the lower battery assembly is engaged with the inner diameter of the lower end of the upper battery assembly using the threads 100, 101 formed on their corresponding wall sides. That is, the upper end of the lower battery assembly is screwed into the lower end of the upper battery assembly until they are fully engaged.

When the lower battery assembly is fully inserted into the upper battery assembly, the upper end of the lower battery assembly 10*a* is in contact with the lower end of the gasket 30, and the electrical connection portion 42 downwardly protruded in the bent 40 is electrically connected to the electrode tap 27 provided on the top surface of the upper insulation plate 13*a*. Conductive paste may be applied to the connection portion to reduce contact resistance.

When the lower battery is combined with the upper battery assembly, the friction on the electrical connection portion 42 subjects the electrode tap 27 to rotational forces. However, the rotation is suppressed because the electrode tap 29 disposed in the lower surface of the electrode assembly 20 is welded to the bottom of the cylindrical lower can 10.

According to this exemplary embodiment, a gap between the electrode assembly and the bent can be significantly reduced as compared to a conventional battery in which beads are provided and the electrode tap is welded to the bent.

Figure 3:
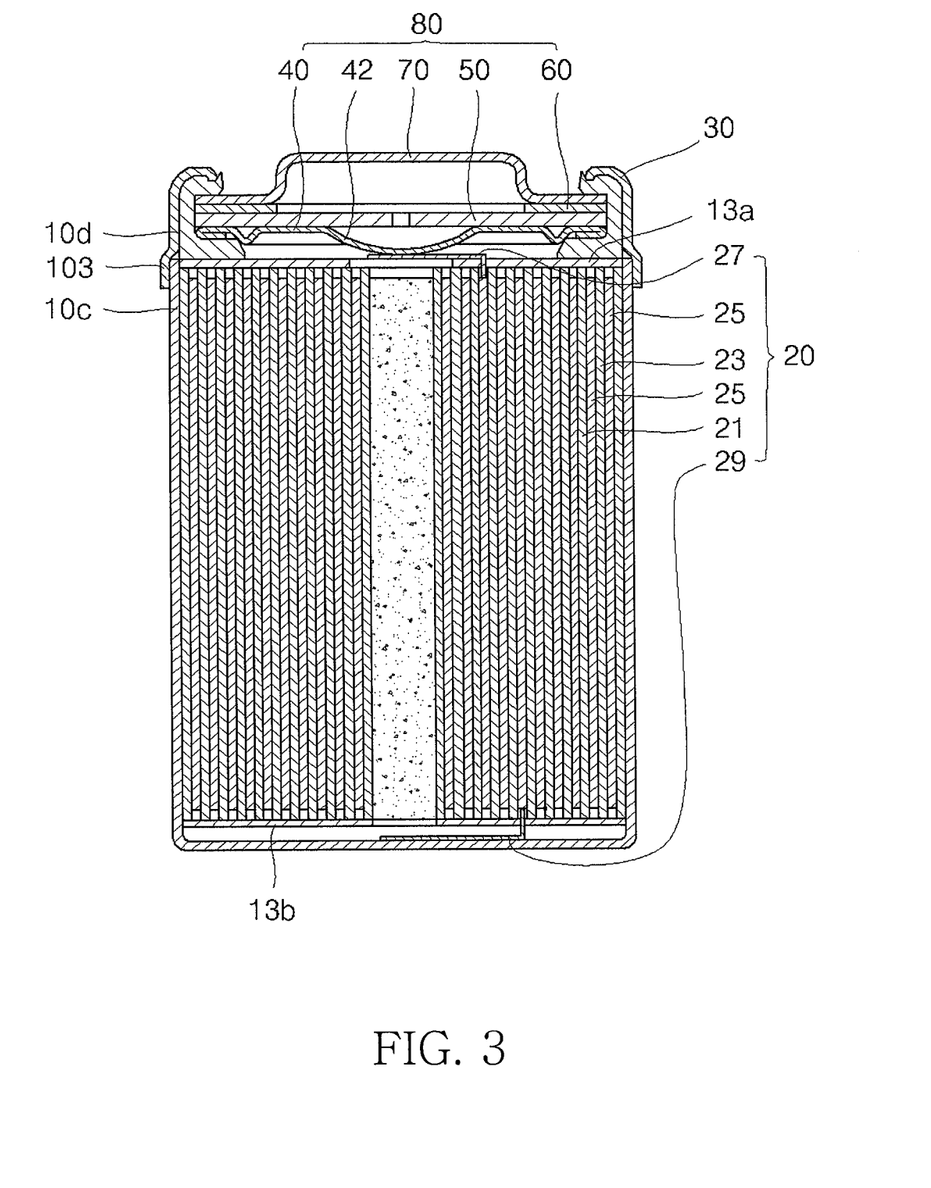
FIG. 3 is a cross-sectional elevation view of a cylindrical can type secondary battery in which upper and lower battery assemblies are engaged by using a sleeve engagement method according to another embodiment of the present invention.

Another embodiment is shown in FIG. 3 wherein the upper and lower battery assemblies are structurally similar, but combined differently.

Referring to FIG. 3, the upper end of the lower can is forcibly inserted into the inside of the lower end of the upper can in an interference fit fashion. In order to facilitate insertion, the lower end portion 103 of the upper can 10*d* has a sleeve having an inner diameter fitted to the outer diameter of the upper end portion of the lower can 10*c*.

Figure 2:
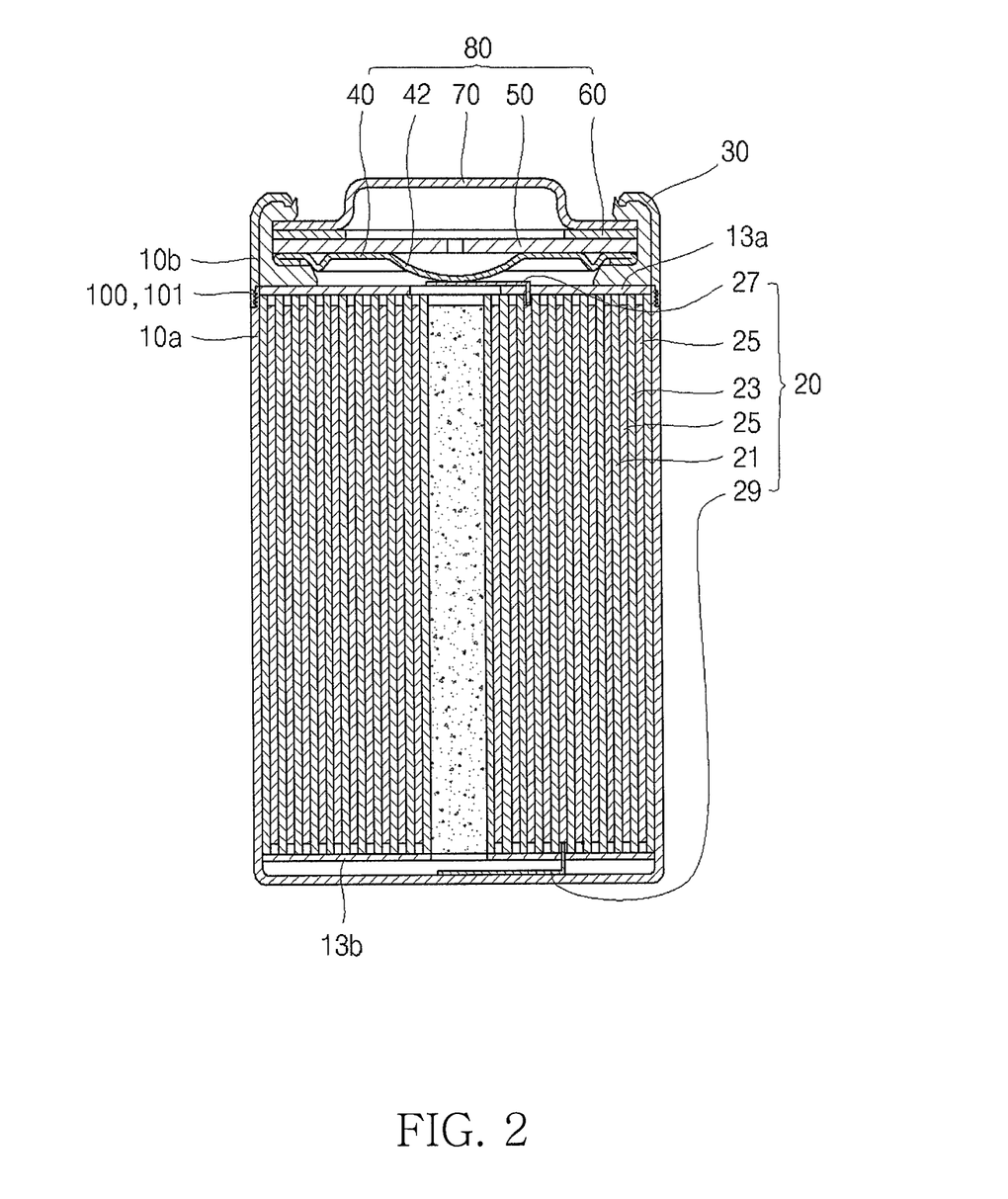
FIG. 2 is a cross-sectional elevation view of a cylindrical can type secondary battery in which upper and lower battery assemblies are engaged by using a screw engagement method according to an embodiment of the present invention.

Similar to the embodiment shown in FIG. 2, the upper end of the lower can 10*c* makes contact with the lower end of the upper can 10*d* when they are combined, and the connection portion 42 downwardly protruded under the bent is electrically connected to the electrode tap fixed on the top surface of the upper insulation plate 13*a*. According to the structure shown in FIG. 3, it is not necessary to screw the upper and lower battery assemblies with respect to each other, and thus, it is possible to neglect synchronous rotation of the electrode tap 27 caused by the friction with the electrode connection portion 42.

Similarly, tape or other adhesive material may be applied to engagement contact portions between the upper and lower battery assemblies to function as a gasket. In one exemplary embodiment, the tape or the adhesive material may have conductivity. After the upper and lower battery assemblies are combined, spot welding or line welding can be applied to some portions around the side wall.

Tubing work may then be performed to envelope an exterior of the battery by using a method as is known in the art.

Figure 4:
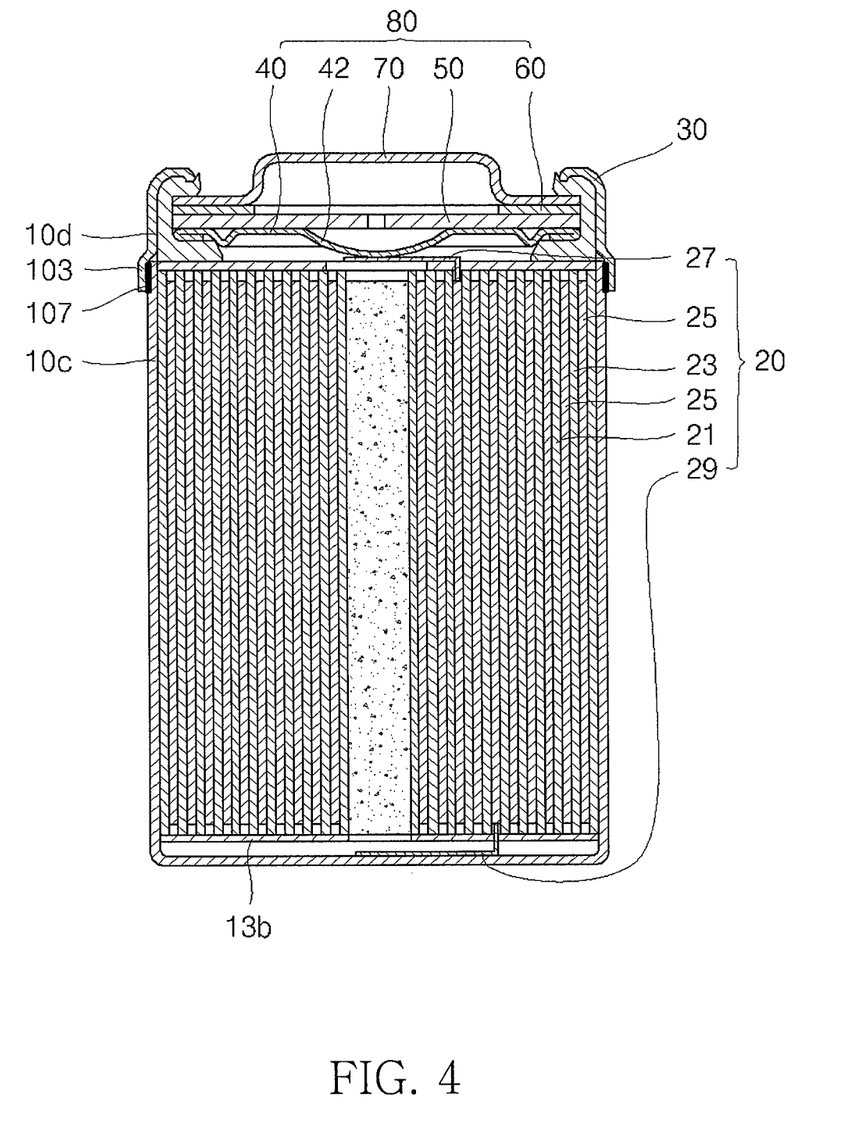
FIG. 4 is a cross-sectional elevation view of cylindrical can type secondary batteries according to FIG. 3 in which an adhesive is applied to engagement contact portions between upper and lower battery assemblies.

Tape or other adhesive materials 107 may be applied to engagement contact portions between the upper and lower battery assemblies as shown in FIG. 4 to function as a gasket. In one exemplary embodiment, the inlayed tape or adhesive material may have conductivity.

Figure 5:
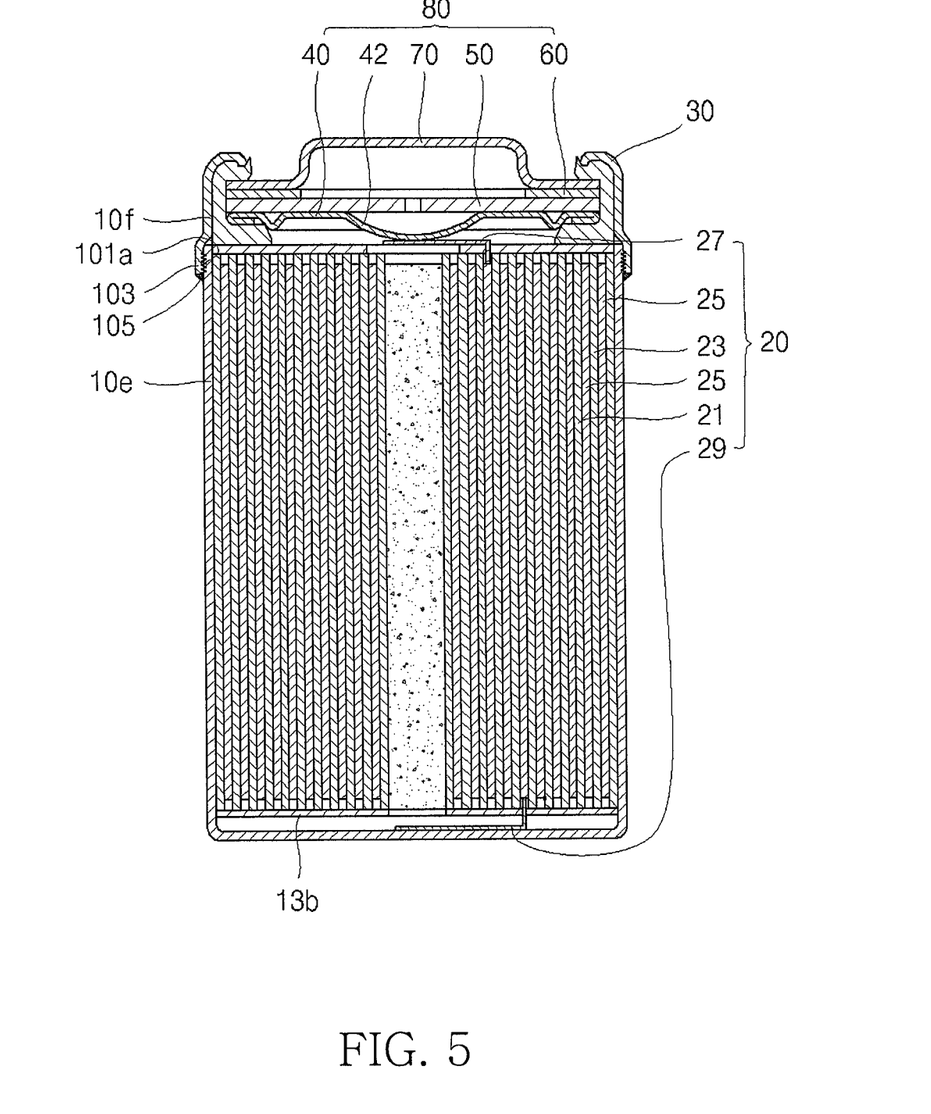
FIG. 5 is a cross-sectional elevation view of cylindrical can type secondary batteries according to another embodiment of the present invention in which an adhesive is applied to engagement contact portions between upper and lower battery assemblies.
Figure 6:
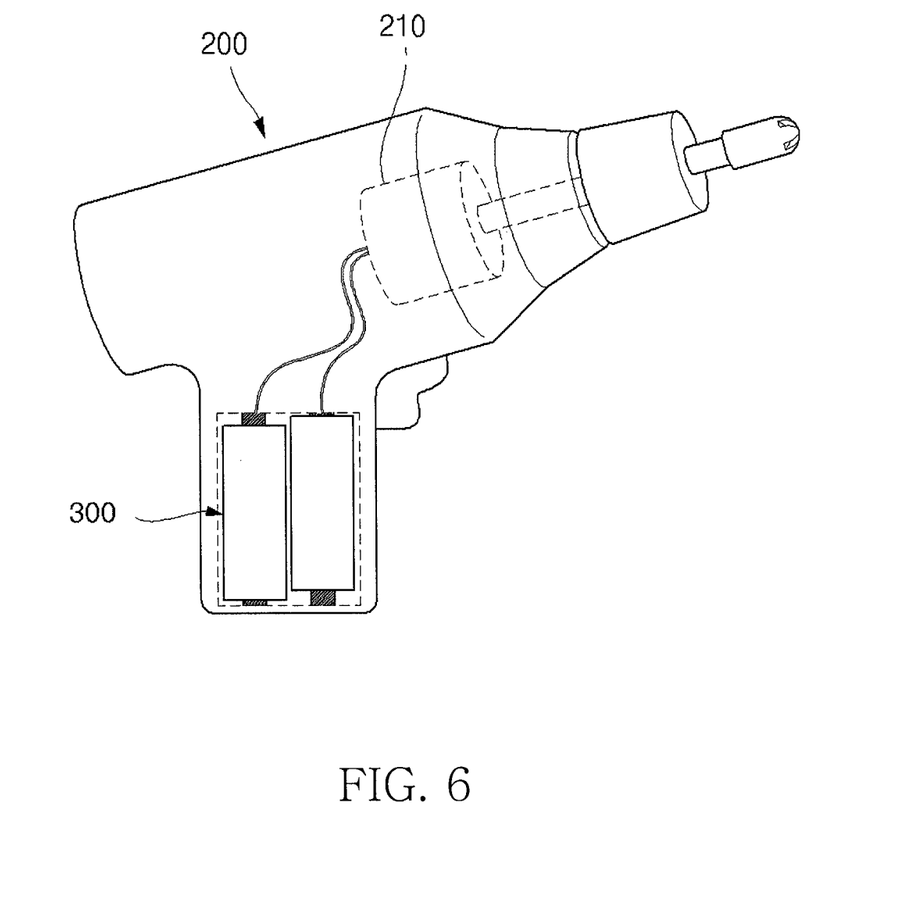
FIG. 6 is a partial perspective view showing an exemplary use of a secondary battery of the present invention in a power tool.

A thread 101*a* on the inner surface of the sleeve 103 may be adapted to combine the upper can 10*f* and the lower can 10*e* as shown in FIG. 5 Additionally as shown in FIG. 5, after the upper and lower battery assemblies are combined in a screw engagement, spot welding 105 or line welding can be applied to some portions around the side wall. A battery 300 of the present invention has a high resistance to external vibration and impact, allowing it to be used to drive the motor 210 of a power tool 200 as shown in FIG. 6.

According to the present invention, there is no need to form beads in a cylindrical battery. Therefore, clamping or pressing is performed without beads, and thus, deformation of beads does not affect the subsequent battery fabricating processes.

Also, it is possible to prevent insufficient sealing of the battery caused when clamping is performed at an insufficient pressure.

Since there is almost no gap between the connection portion of the bent of the cap unit and the electrode tap of the electrode assembly when the upper and lower battery assemblies are combined, the size of the electrode assembly can be relatively increased compared to a comparably sized conventional secondary battery. Therefore, it is possible to increase battery capacity and minimize battery size.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined by the appended claims, and all differences within the scope will be construed as being included in the present invention.

What is claimed is:

1. A secondary battery comprising:
   an upper battery assembly comprising an upper can housing a cap unit to be electrically connected to an external device and a gasket for insulating the cap unit and the upper can; and
   a lower battery assembly comprising an electrically conductive lower can housing an electrode assembly,
      the electrode assembly comprising a first electrode, a second electrode and a separator, and
      the upper can and the lower can being combined with each other at an overlapping region of the upper can and the lower can, the overlapping region being aligned with an upper end of the electrode assembly,
   wherein the gasket contacts the upper can directly adjacent the overlapping region, and
   wherein the cap unit and the upper can are combined by clamping, and
   wherein the upper and the lower battery assemblies are combined by a screw engagement using threads formed on a lower portion of the upper can and an upper portion of the lower can, welding between a lower portion of the upper can and an upper portion of the lower can, or sleeves formed on one of a lower portion of the upper can and an upper portion of the lower can.

2. The secondary battery according to claim 1, wherein the cap unit comprises a bent having a connection portion protruding therefrom, a current interrupt device connected to the bent, a positive thermal coefficient element connected to the current interrupt device, and a cap-up providing an electrode terminal.

3. The secondary battery according to claim 1,
   wherein a first electrode tab extends from an upper end of the electrode assembly and a second electrode tab extends from a lower end of the electrode assembly;
   wherein an upper insulation plate and a lower insulation plate are respectively installed on and adjacent to the upper end of the electrode assembly and the lower end of the electrode assembly;
   wherein the first electrode tab extending from the upper end of the electrode assembly is bent and attached to a fixing member formed on a surface of the upper insulation plate so as to provide an electrical connection to the cap unit; and
   wherein the second electrode tab extending from the lower end of the electrode assembly is bent under the lower insulation plate and welded to a surface of the lower can.

4. The secondary battery according to claim 1, wherein the can type secondary battery is a can shape secondary battery and configured to drive an electric power tool motor.

* * * * *